United States Patent
Wada et al.

(10) Patent No.: US 7,301,729 B2
(45) Date of Patent: Nov. 27, 2007

(54) SUSPENSION, HEAD GIMBAL ASSEMBLY WITH MULTILAYERED PLATE SUSPENSION HAVING RIBS AND DISK DRIVE APPARATUS WITH HEAD GIMBAL ASSEMBLY

(75) Inventors: Takeshi Wada, Tokyo (JP); Takashi Honda, Tokyo (JP)

(73) Assignee: TDK Corporation, Tokyo (JP)

( * ) Notice: Subject to any disclaimer, the term of this patent is extended or adjusted under 35 U.S.C. 154(b) by 541 days.

(21) Appl. No.: 10/828,264

(22) Filed: Apr. 21, 2004

(65) Prior Publication Data

US 2004/0228037 A1    Nov. 18, 2004

(30) Foreign Application Priority Data

May 15, 2003    (JP)   .............. 2003-137340

(51) Int. Cl.
*G11B 5/48*      (2006.01)

(52) U.S. Cl. .............................. 360/244.3; 360/244.2; 360/244.4; 360/244.5

(58) Field of Classification Search .............. 360/244.3
See application file for complete search history.

(56) References Cited

U.S. PATENT DOCUMENTS

| | | | | |
|---|---|---|---|---|
| 5,187,625 A | * | 2/1993 | Blaeser et al. ........... | 360/244.3 |
| 6,356,414 B1 | * | 3/2002 | Traskos et al. ........... | 360/244.3 |
| 6,574,075 B2 | * | 6/2003 | Traskos et al. ........... | 360/244.3 |
| 7,133,259 B2 | * | 11/2006 | Takagi et al. ............ | 360/244.3 |
| 7,224,554 B2 | * | 5/2007 | Wright ..................... | 360/244.3 |
| 2002/0181155 A1 | * | 12/2002 | Takagi et al. ............ | 360/244.3 |

FOREIGN PATENT DOCUMENTS

| | | | |
|---|---|---|---|
| GB | 2193833 A | * | 2/1988 |
| JP | 60-116668 | | 8/1985 |
| JP | 7-254246 | | 10/1995 |
| JP | 2001-57032 | | 2/2001 |
| JP | 2002-352540 | | 12/2002 |
| JP | 2003-59223 | | 2/2003 |

* cited by examiner

*Primary Examiner*—Angel Castro
*Assistant Examiner*—Christopher R. Magee
(74) *Attorney, Agent, or Firm*—Oblon, Spivak, McClelland, Maier & Neustadt, P.C.

(57) ABSTRACT

A suspension includes a multilayered plate member formed by at least three layers laminated together. The modulus of elasticity of neighboring layers of the at least three layers are different from each other. Both side edges of only a part of the layers of the multilayered plate member within a stiffness-required region are bent to form ribs.

16 Claims, 7 Drawing Sheets

SUSPENSION, HEAD GIMBAL ASSEMBLY WITH MULTILAYERED PLATE SUSPENSION HAVING RIBS AND DISK DRIVE APPARATUS WITH HEAD GIMBAL ASSEMBLY

PRIORITY CLAIM

This application claims priority from Japanese patent application No.2003-137340, filed on May 15, 2003, which is incorporated herein by reference.

BACKGROUND OF THE INVENTION

1. Field of the Invention

The present invention relates to a suspension for supporting a flying type head slider providing a head element such as a thin-film magnetic head element or an optical head element, to a head gimbal assembly (HGA) with the suspension, and to a disk drive apparatus with the HGA.

2. Description of the Related Art

In a magnetic disk drive apparatus, thin-film magnetic head elements for writing magnetic information into and/or reading magnetic information from magnetic disks are in general formed on magnetic head sliders flying in operation above the rotating magnetic disks. The sliders are supported at top end sections of suspensions of HGAs, respectively.

Japanese patent publication 2001-057032A discloses such suspension with a load beam made of a thin stainless steel plate. The load beam has bends or ribs at both side ends thereof to enhance the bending stiffness.

For a magnetic disk drive apparatus used in a disk top type computer and a server type computer, a suspension with such structure can be adopted without any problem occurring. This is because such computers are immovably used, and therefore neither serious impact nor vibration is applied thereto. Whereas, for a smaller magnetic disk drive apparatus with a 2.5 inches or less disk to be mainly mounted on a portable computer, such suspension is insufficient in the impact resistance due to insufficient bending stiffness of its load beam.

In order to increase the bending stiffness of the load beam, Japanese patent publication 2002-352540A proposes using a multilayered metal sheet made of two metal films bonded by an adhesive or adhering sheet as the load beam, instead of a thin stainless steel plate.

However, even if such multilayered metal sheet is used as the load beam, because of the thin thickness of the metal sheet, it is quite difficult to satisfy the required bending stiffness of the load beam for the 2.5 inches or less magnetic disk drive apparatus. If metal sheets with an extremely high thickness are used as for the multilayered metal sheet, relatively high bending stiffness may be expected. However, in the latter case, the manufacturing cost of the suspension will greatly increase.

BRIEF SUMMARY OF THE INVENTION

It is therefore an object of the present invention to provide a suspension, an HGA with the suspension, and a disk drive apparatus with the HGA, whereby a high bending stiffness can be obtained without greatly increasing a manufacturing cost.

According to the present invention, a suspension includes a multilayered plate member formed by at least three layers laminated together. Modulus of elasticity of neighbor layers of the at least three layers are different from each other. Both side edges of only a part of the layers of the multilayered plate member within a stiffness-required region are bent to form ribs.

Conventionally, ribs were not formed in a multilayered suspension with three or more layers. Whereas, according to the present invention, both side edges of only a part of the layers of the multilayered suspension are bent to form ribs. Thus, not only the bending process can be performed very easy but also sufficient large bending stiffness can be obtained. Particularly, according to the present invention, since it is not necessary to thicken each layer of the suspension, the total weight of the suspension will not increase and the manufacturing costs can be kept low.

Also, according to the present invention, an HGA includes the above-mentioned suspension, and a head slider provided with at least one head element and mounted on the suspension. A disk drive apparatus according to the present invention will have at least one HGA.

It is preferred that both side edges of only a surface layer of the multilayered plate member within a stiffness required region are bent to form ribs.

It is also preferred that both side edges of only a surface layer and its neighbor layer of the multilayered plate member within a stiffness required region are bent to form ribs.

It is preferred that at least one layer of the multilayered plate member has a plane shape different from that of the other layer of the multilayered plate member.

It is also preferred that the multilayered plate member includes a first thin metal plate layer, a resin layer laminated on the first thin metal plate layer, and a second thin metal plate layer laminated on the resin layer.

It is further preferred that the multilayered plate member includes a first thin metal plate layer, a second thin metal plate layer laminated on the first thin metal plate layer and provided with an elasticity coefficient different from that of the first thin metal plate layer, and a third thin metal plate layer laminated on the second thin metal plate layer and provided with an elasticity coefficient different from that of the second thin metal plate layer.

It is still further preferred that the multilayered plate member includes a first thin metal plate layer, a first resin layer laminated on the first thin metal plate layer, a second thin metal plate layer laminated on the first resin layer, a second resin layer laminated on the second thin metal plate layer, and a third thin metal plate layer laminated on the second resin layer.

It is also preferred that the multilayered plate member includes a first thin metal plate layer, a second thin metal plate layer laminated on the first thin metal plate layer and provided with an elasticity coefficient different from that of the first thin metal plate layer, a third thin metal plate layer laminated on the second thin metal plate layer and provided with an elasticity coefficient different from that of the second thin metal plate layer, a fourth thin metal plate layer laminated on the third thin metal plate layer and provided with an elasticity coefficient different from that of the third thin metal plate layer, and a fifth thin metal plate layer laminated on the fourth thin metal plate layer and provided with an elasticity coefficient different from that of the fourth thin metal plate layer.

According to the present invention, further, a suspension includes a multilayered plate member formed by at least three layers laminated together, and a reinforce member laminated on only both side edge sections of a surface layer of the multilayered plate member within a stiffness required region. Modulus of elasticity of neighbor layers of the at least three layers are different from each other.

In a multilayered suspension with three or more layers, a reinforced member is laminated on only both side edge sections of a surface layer of the suspension. Thus, sufficient large bending stiffness can be obtained. Particularly, according to the present invention, since it is not necessary to thicken each layer of the suspension, total weight of the suspension will not increase and the manufacturing cost can be kept low.

Also, according to the present invention, an HGA includes the above-mentioned suspension, and a head slider provided with at least one head element and mounted on the suspension. A disk drive apparatus according to the present invention will have at least one HGA.

It is preferred that the reinforce member includes a single layer structure of a thin metal layer or a resin layer.

It is also preferred that the reinforce member includes a multilayered plate member with a thin metal plate layer and a resin layer laminated on the thin metal plate layer.

It is also preferred that the reinforce member includes a multilayered plate member with a first thin metal plate layer, and a second thin metal plate layer laminated on the first thin metal plate layer and provided with an elasticity coefficient different from that of the first thin metal plate layer.

It is preferred that at least one layer of the multilayered plate member has a plane shape different from that of the other layer of the multilayered plate member.

It is also preferred that the multilayered plate member includes a first thin metal plate layer, a resin layer laminated on the first thin metal plate layer, and a second thin metal plate layer laminated on the resin layer.

It is preferred that the multilayered plate member includes a first thin metal plate layer, a second thin metal plate layer laminated on the first thin metal plate layer and provided with an elasticity coefficient different from that of the first thin metal plate layer, and a third thin metal plate layer laminated on the second thin metal plate layer and provided with an elasticity coefficient different from that of the second thin metal plate layer.

It is also preferred that the multilayered plate member includes a first thin metal plate layer, a first resin layer laminated on the first thin metal plate layer, a second thin metal plate layer laminated on the first resin layer, a second resin layer laminated on the second thin metal plate layer, and a third thin metal plate layer laminated on the second resin layer.

It is further preferred that the multilayered plate member includes a first thin metal plate layer, a second thin metal plate layer laminated on the first thin metal plate layer and provided with an elasticity coefficient different from that of the first thin metal plate layer, a third thin metal plate layer laminated on the second thin metal plate layer and provided with an elasticity coefficient different from that of the second thin metal plate layer, a fourth thin metal plate layer laminated on the third thin metal plate layer and provided with an elasticity coefficient different from that of the third thin metal plate layer, and a fifth thin metal plate layer laminated on the fourth thin metal plate layer and provided with an elasticity coefficient different from that of the fourth thin metal plate layer.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 5a is an exploded oblique view schematically illustrating the whole structure of a load beam also serving as a base plate of the suspension in another embodiment according to the present invention;

FIG. 5b is an oblique view schematically illustrating a part of a top end section of the load beam shown in FIG. 5a;

FIG. 6b is an exploded oblique view of the load beam shown in FIG. 6a;

FIG. 7b is an exploded oblique view of the load beam shown in FIG. 7a;

FIG. 8b is an exploded oblique view of the load beam shown in FIG. 8a;

FIG. 9a is an exploded oblique view schematically illustrating the whole structure of a load beam also serving as a base plate of the suspension in further embodiment according to the present invention;

FIG. 9b is an oblique view schematically illustrating a part of a top end section of the load beam shown in FIG. 9a;

FIG. 10a is an exploded oblique view schematically illustrating the whole structure of a load beam also serving as a base plate of the suspension in still further embodiment according to the present invention;

FIG. 10b is an oblique view schematically illustrating a part of a top end section of the load beam shown in FIG. 10a;

FIG. 11b is an oblique view schematically illustrating the whole structure of the load beam shown in FIG. 11a; and FIG. 11c is an oblique view schematically illustrating a part of a top end section of the load beam shown in FIG. 11a.

DETAILED DESCRIPTION OF THE INVENTION

Figure 1:
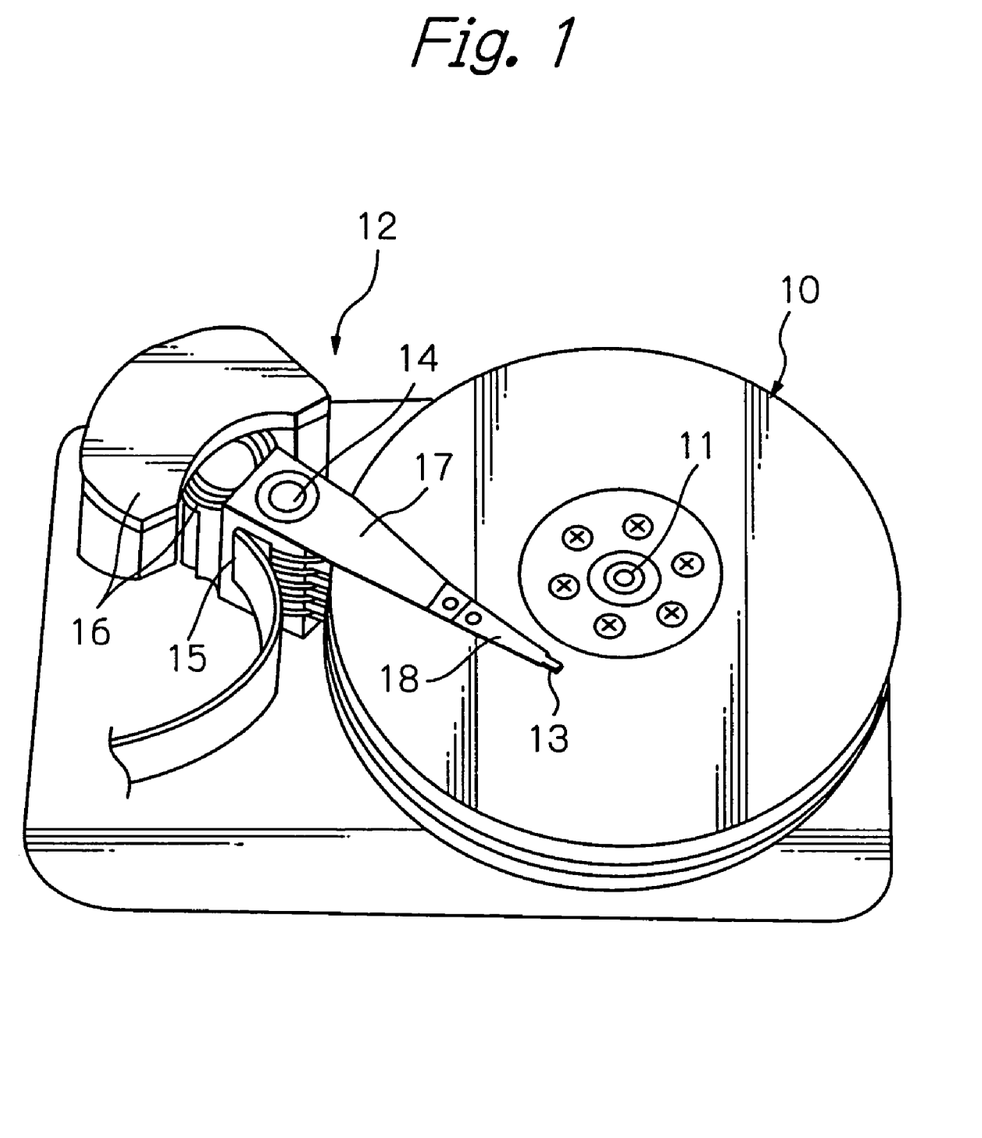
FIG. 1 is an oblique view schematically illustrating main components of a magnetic disk drive apparatus in a preferred embodiment according to the present invention.
Figure 2:
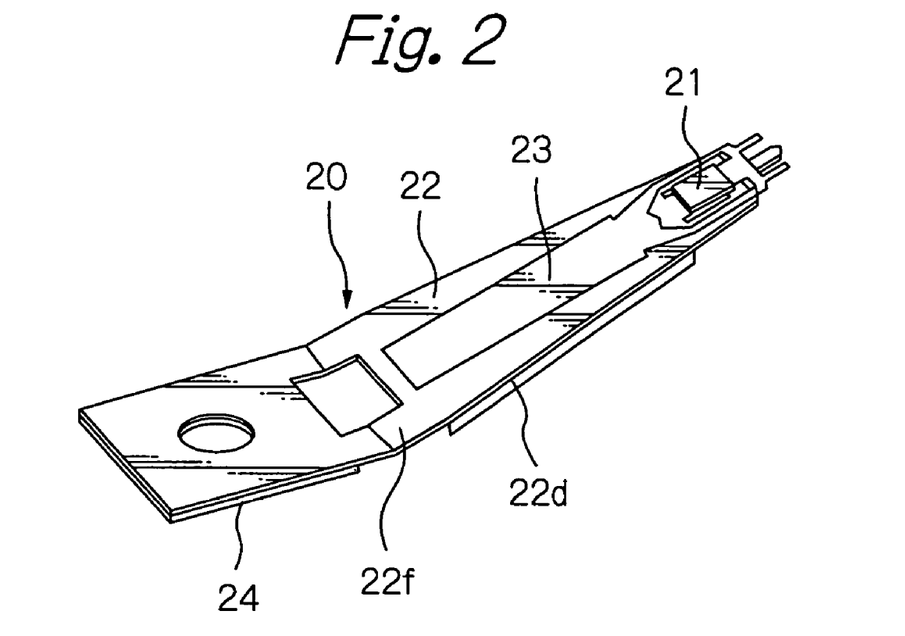
FIG. 2 is an oblique view illustrating the whole structure of an HGA in the embodiment of FIG. 1 seen from the side providing with a magnetic head slider.
Figure 3:
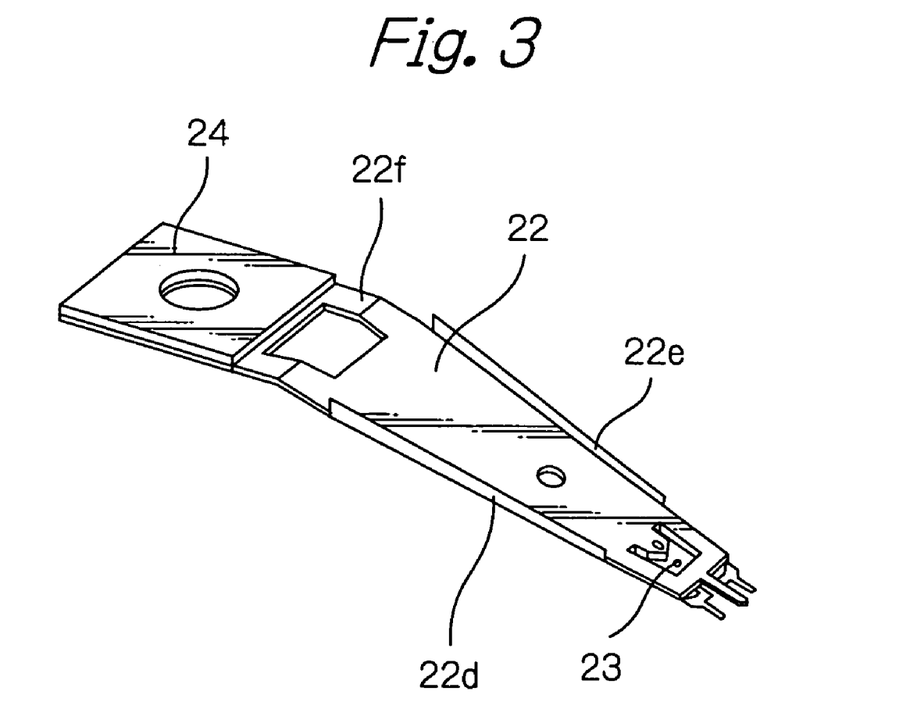
FIG. 3 is an oblique view illustrating the whole structure of the HGA seen from the opposite side of FIG. 2.
Figure 4:
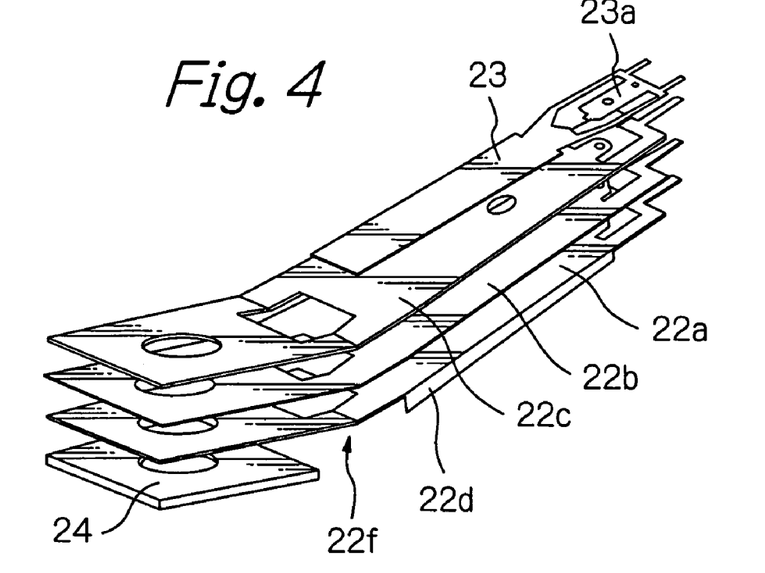
FIG. 4 is an exploded oblique view illustrating a suspension in the embodiment of FIG. 1 seen from the same side of FIG. 2.

FIG. 1 schematically illustrates the main components of a magnetic disk drive apparatus in a preferred embodiment according to the present invention, FIG. 2 illustrates the entire structure of an HGA in the embodiment of FIG. 1 as seen from the side providing with a magnetic head slider, FIG. 3 illustrates the whole structure of the HGA seen from the opposite side of FIG. 2, and FIG. 4 illustrates a suspension in the embodiment of FIG. 1 seen from the same side of FIG. 2.

In FIG. 1, reference numeral 10 denotes a plurality of magnetic hard disks rotating around an axis 11, and 12 denotes an assembly carriage device for positioning each magnetic head slider 13 on a track of each disk. The assembly carriage device 12 is mainly constituted by a carriage 15 capable of rotating around an axis 14 and an actuator 16 such as for example a voice coil motor (VCM) for driving the carriage 15 to rotate.

Base sections of a plurality of drive arms 17 stacked along the axis 14 are attached to the carriage 15, and one or two HGAs 18 are mounted on a top end section of each arm 17. Each of the HGAs 18 has the magnetic head slider 13 mounted at its top end section so that the slider 13 opposes to one surface (recording and reproducing surface) of each of the magnetic disks 10.

As shown in FIGS. 2 to 4, the HGA is assembled by fixing a magnetic head slider 21 (13) with a magnetic head element to a top end section of a suspension 20.

The suspension 20 is substantially configured, as shown in FIGS. 2 and 3, by assembly of a load beam 22, a resilient flexure 23 fixed on the load beam 22, and a base plate 24 fixed to a base section of the load beam 22.

The load beam 22 in this embodiment is obtained by shaping a multilayered plate member. This multilayered plate member is, as clearly shown in FIG. 4, formed by laminating a first thin metal plate layer 22a such as a stainless steel plate with a thickness of about 51 μm for example, a resin layer 22b such as a polyimide resin plate with a thickness of about 75 μm for example, and a second thin metal plate layer 22c such as a stainless steel plate with a thickness of about 51 μm for example, in this order from the top.

Particularly, in this embodiment, both side edges of only the first thin metal plate layer 22a that is a surface layer (an upper or top surface layer or a lower or bottom surface layer in the laminating direction) of the load beam are bent toward a direction moving away from the neighbor resin layer 22b to form bending sections or ribs 22d and 22e. The ribs 22d and 22e at the both side edges are formed only within a region where high stiffness is required for the load beam 22. No rib is formed in a load generation region 22f for producing a force to press the magnetic head slider 21 toward the magnetic disk surface, and thus this region 22f has elasticity.

The flexure 23 has a flexible tongue 23a depressed by a dimple (not shown) formed on the load beam 22 at its one end section. On the tongue 23a, the magnetic head slider 21 is fixed. The flexure 23 is made of in this embodiment a stainless steel thin plate (for example SUS304TA) with a thickness of about 20 μm to have elasticity for supporting flexibly the magnetic head slider 21 by the tongue 23a. Fixing of the flexure 23 with the load beam 22 and fixing of the load beam 22 with the base plate 24 are performed by pinpoint welding at a plurality of points.

In this embodiment, the flexure 23 is fixed to the second thin metal plate layer 22c of the load beam 22, and the magnetic head slider 21 is fixed on the flexure 23 as aforementioned. Therefore, the ribs 22d and 22e of the load beam 22 are bent so as to protrude from the surface of the suspension 20 opposite to the surface on which the slider 21 is mounted.

The base plate 24 to be attached to the drive arm 17 shown in FIG. 1 is made of in this embodiment a stainless steel thin plate with a thickness of about 150 μm.

As for the HGA, a flexible lead conductor member, not shown in FIGS. 2 to 4, provided with a plurality of trace conductors in a laminated thin-film pattern may be formed or attached on the flexure 23. This lead conductor member may be formed by a known method similar to the patterning method of forming a printed circuit board on a thin metal plate such as a flexible printed circuit (FPC).

Since both side edges of only the first thin metal plate layer 22a that is a surface layer (an upper or top surface layer or a lower or bottom surface layer in the laminating direction) are bent to form the ribs, not only the bending process can be performed very easy but also sufficient bending stiffness can be obtained even if the load beam is thin. Particularly, according to this embodiment, since it is not necessary to thicken each layer of the load beam, total weight of the suspension will not increase and the manufacturing cost can be kept low.

Figures 5A, 5B:
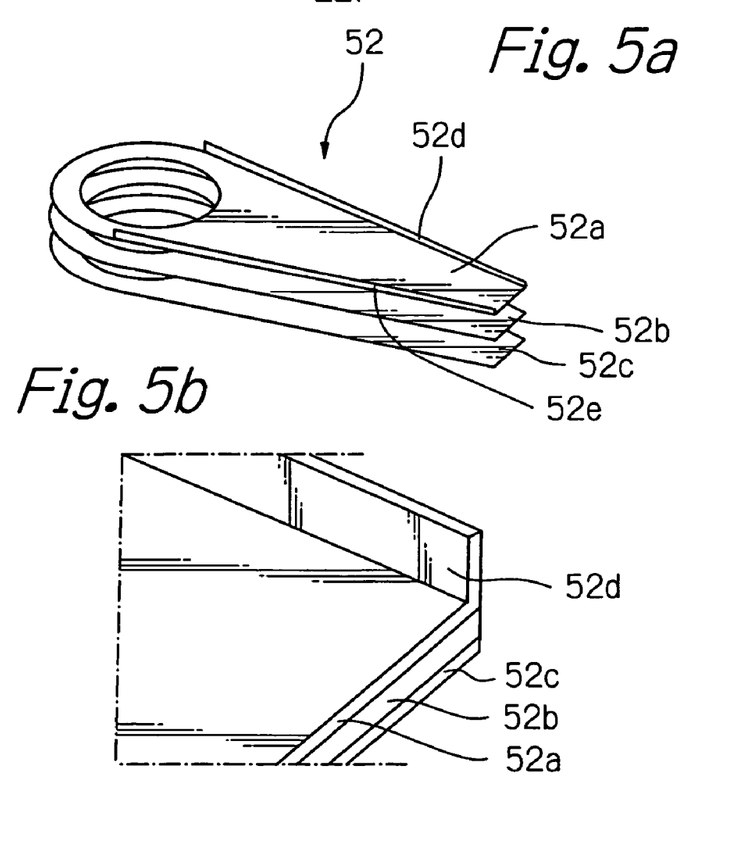

FIG. 5a schematically illustrates the entire structure of a load beam also serving as a base plate of the suspension in another embodiment according to the present invention, and FIG. 5b schematically illustrates a part of a top end section of the load beam shown in FIG. 5a.

In this embodiment, the load beam has no load generation region for producing a force to press the magnetic head slider toward the magnetic disk surface, and the whole section of the load beam has a high stiffness. The load force applied to the magnetic head slider will be produced by some kind of load generation means other than the load beam in this embodiment.

The load beam 52 in this embodiment is obtained by shaping a multilayered plate member. This multilayered plate member is, as clearly shown in FIGS. 5a and 5b, formed by laminating a first thin metal plate layer 52a such as a stainless steel plate with a thickness of about 51 μm for example, a resin layer 52b such as a polyimide resin plate with a thickness of about 75 μm for example, and a second thin metal plate layer 52c such as a stainless steel plate with a thickness of about 51 μm for example, in this order from the top.

Particularly, in this embodiment, both side edges of only the first thin metal plate layer 52a that is a surface layer (an upper or top surface layer or a lower or bottom surface layer in the laminating direction) of the load beam are bent toward a direction moving away from the neighbor resin layer 52b to form bending sections or ribs 52d and 52e. The ribs 52d and 52e at the both side edges are formed along substantially the whole region except for a section used for attaching the load beam 52 to a drive arm.

The load beam with such structure is formed by bonding sheets 52a, 52b and 52c together, which have been preliminarily shaped such that both side edges of only the surface sheet that corresponds to the first thin metal plate layer 52a are outwardly extending in plane, and then by stamping the bonded sheets using for example a stamping die to bend the outwardly extending side edges of the sheet 52a. Alternately, the load beam may be formed by bonding together sheets 52a, 52b and 52c with the same shape, then by shaping or by etching for example the bonded sheet so that both side edges of only the surface sheet that corresponds to the first thin metal plate layer 52a outwardly extends in plane, and thereafter by stamping the sheets using for example a stamping die to bend the outwardly extending side edges of the sheet 52a.

Since both side edges of only the first thin metal plate layer 52a that is a surface layer (an upper or top surface layer or a lower or bottom surface layer in the laminating direction) are bent to form the ribs, not only the bending process can be performed very easy but also sufficient bending stiffness can be obtained even if the load beam is thin. Particularly, according to this embodiment, since it is not necessary to thicken each layer of the load beam, total weight of the suspension will not increase and the manufacturing cost can be kept low.

Hereinafter, disadvantages of suspension structures analyzed by inventors of this application and advantages of the suspension structures according to the present invention will be described in detail.

Figure 6A:
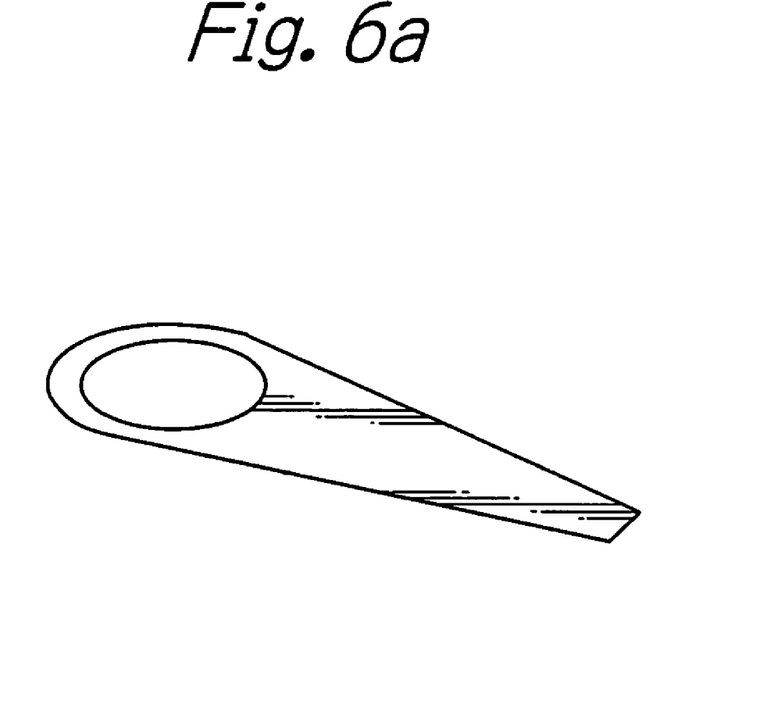
FIG. 6a is an oblique view illustrating the whole structure of a load beam also serving as a base plate of a suspension analyzed by inventors of this application.
Figure 6B:
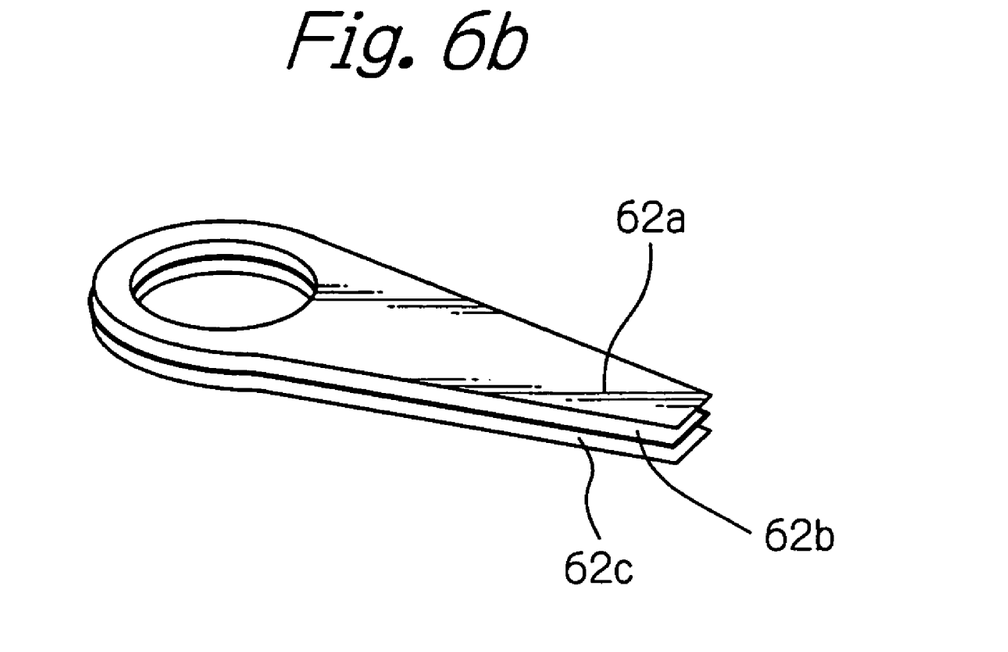
Figure 7A:
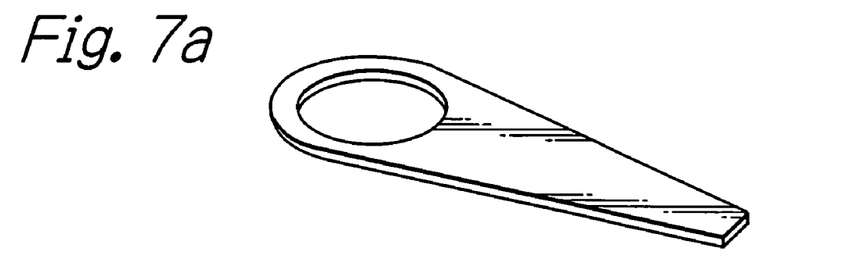
FIG. 7a is an oblique view illustrating the whole structure of a load beam also serving as a base plate of a suspension analyzed by the inventors.
Figure 7B:
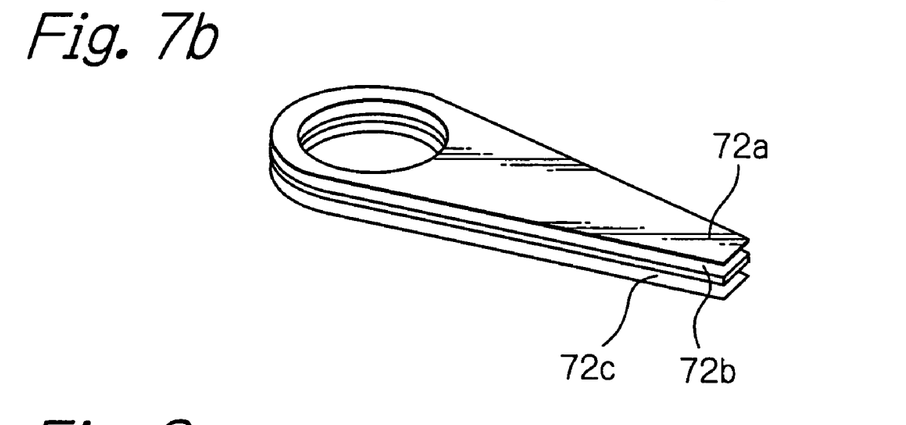
Figure 8A:
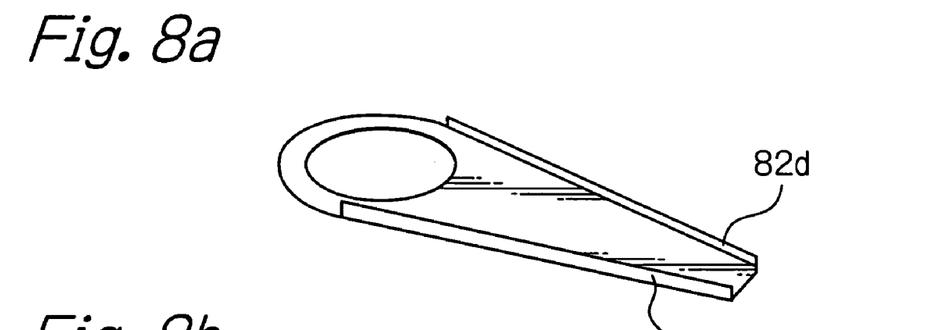
FIG. 8a is an oblique view illustrating the whole structure of a load beam also serving as a base plate of a suspension analyzed by the inventors.
Figure 8B:
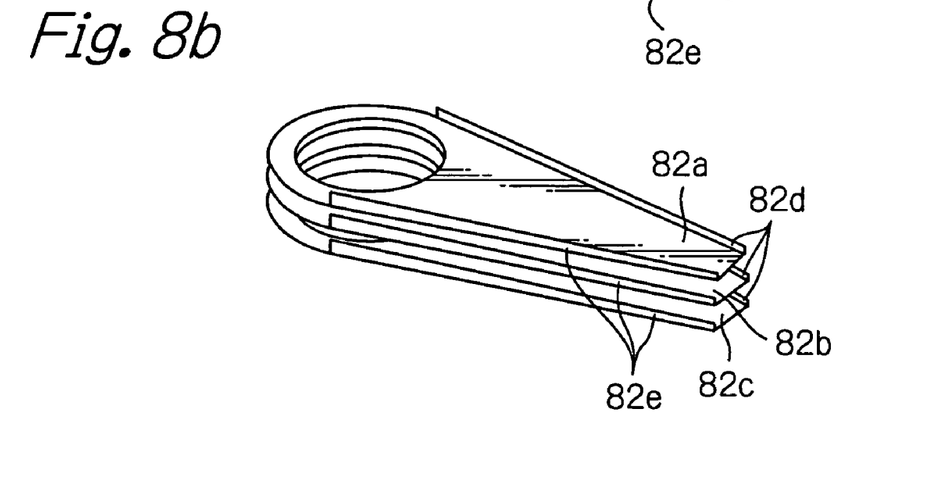

FIG. 6a illustrates the whole structure of a load beam also serving as a base plate of a suspension analyzed by the inventors, FIG. 6b illustrates the load beam shown in FIG. 6a, FIG. 7a illustrates the whole structure of a load beam also serving as a base plate of a suspension analyzed by the inventors, FIG. 7b illustrates the load beam shown in FIG. 7a, FIG. 8a illustrates the whole structure of a load beam also serving as a base plate of a suspension analyzed by the inventors, and FIG. 8b illustrates the load beam shown in FIG. 8a.

As shown in FIGS. 6a and 6b, instead of a single stainless steel thin plate, if the load beam is formed by a multilayered plate member constituted by only laminating a first thin metal plate layer 62a, a resin layer 62b and a second thin metal plate layer 62c in this order from the top, a sufficient bending stiffness cannot expected due to its small thickness. Bending stiffness of the structures of FIGS. 7a and 7b and FIGS. 8a and 8b is analyzed by simulation in comparison with the structure of FIGS. 6a and 6b. In the structure of FIGS. 7a and 7b, the load beam is formed by laminating a first thin metal plate layer 72a, a resin layer 72b with an extremely large thickness, and a second thin metal plate layer 72c in this order from the top. In the structure of FIGS. 8a and 8b, the load beam is formed by laminating a first thin metal plate layer 82a, a resin layer 82b, and a second thin metal plate layer 82c in this order from the top, each of the layers 82a, 82b and 82c having ribs 82d and 82e at its both side edges. In the structure of FIGS. 6a and 6b, each of the first and second thin metal plate layers 62a and 62c is constituted by a stainless steel thin plate with a thickness of 51 μm, and a resin layer 62b is constituted by an engineering plastic layer with a thickness of 75 μm. In the structure of FIGS. 7a and 7b, each of the first and second thin metal plate layers 72a and 72c is constituted by a stainless steel thin plate with a thickness of 51 μm, and a resin layer 72b is constituted by an engineering plastic layer with a thickness of 300 μm. In the structure of FIGS. 8a and 8b, each of the first and second thin metal plate layers 82a and 82c is constituted by a stainless steel thin plate with a thickness of 51 μm, and a resin layer 82b is constituted by an engineering plastic layer with a thickness of 75 μm.

The results of this simulation are shown in Table 1.

TABLE 1

|  | Primary Bending Mode | Primary Torsion Mode | Secondary Bending Mode |
|---|---|---|---|
| Structure of FIGS. 6a and 6b | 1428.9 Hz | 8703 Hz | 6984.3 Hz |
| Structure of FIGS. 7a and 7b | 3451.3 Hz | 18547 Hz | 15684.0 Hz |
| Structure of FIGS. 8a and 8b | 2132.9 Hz | 8341 Hz | 9536.6 Hz |

As will be understood from Table 1, the structure of FIGS. 6a and 6b has insufficient stiffness because its primary bending mode is less than 1500 Hz. On the other hand, the structures of FIGS. 7a and 7b and FIGS. 8a and 8b have sufficient stiffness because their primary bending mode is over 2000 Hz. However, the structure of FIGS. 7a and 7b has difficulty in commercialization. This is because the performance of the suspension is poor due to its heavy weight and the manufacturing cost is greatly increased due to the thick resin layer. Also, since bending of all of the layers to form the ribs is quite difficult in the manufacturing process, the structure of FIGS. 8a and 8b has difficulty in commercialization.

Further, bending stiffness of the structures of this embodiment shown in FIGS. 5a and 5b, and also bending stiffness of another embodiments shown in FIGS. 9a and 9b and FIGS. 10a and 10b were analyzed by simulation. Table 2 shows the results of this simulation.

TABLE 2

Figures 9A, 9B:
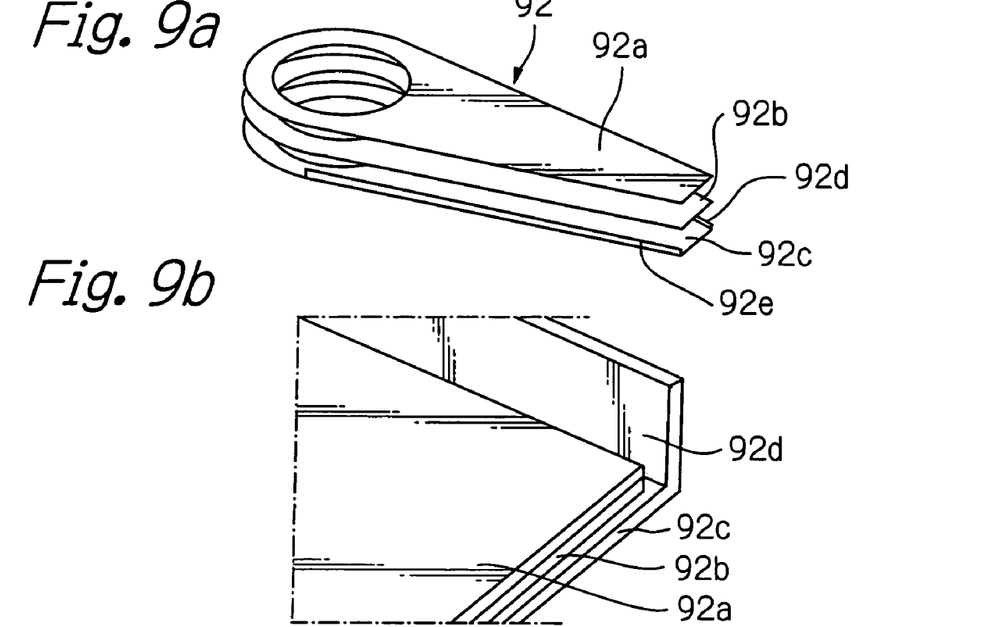
Figures 10A, 10B:
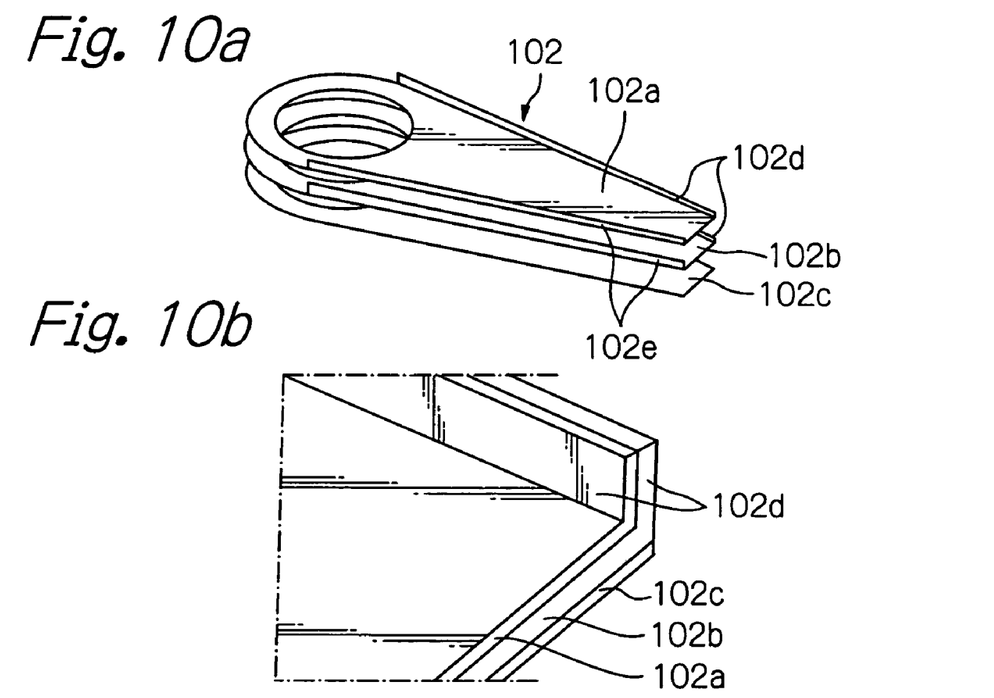

|  | Primary Bending Mode | Primary Torsion Mode | Secondary Bending Mode |
|---|---|---|---|
| Structure of FIGS. 5a and 5b | 1994.6 Hz | 8801.9 Hz | 9425.2 Hz |
| Structure of FIGS. 9a and 9b | 1930.2 Hz | 8511.6 Hz | 9364.1 Hz |
| Structure of FIGS. 10a and 10b | 1975.3 Hz | 8564.5 Hz | 9536.6 Hz |

As will be understood from Table 2, the structure of this embodiment of FIGS. 5a and 5b in which both side edges of only the first thin metal plate layer 52a that is a surface layer are bent to form the ribs has sufficient bending stiffness because its primary bending mode is near 2000 Hz.

The multilayered plate member of the load beam in this embodiment is a three-layer structure consisting of the first thin metal plate layer, the resin layer and the second thin metal plate layer. In modification, however, the multilayered plate member may be a three-layer structure consisting of a first thin metal plate layer, a second thin metal plate layer made of metal material with a different elasticity coefficient from that of the first thin metal plate layer, and a third thin metal plate layer made of metal material with a different elasticity coefficient from that of the second thin metal plate layer. A thin metal plate made of metal material with a different elasticity coefficient from that of the stainless steel thin plate may be for example an aluminum thin plate or a titanium thin plate.

In further modification, the multilayered plate member may be a four-layer structure consisting of a first thin metal plate layer, a first resin layer, a second thin metal plate layer and a second resin layer, or a four-layer structure consisting of a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, and a fourth thin metal plate layer made of metal material with a different elasticity coefficient from that of the third thin metal plate layer.

In still further modification, the multilayered plate member may be a five or more layer structure containing a first thin metal plate layer, a first resin layer, a second thin metal plate layer, a second resin layer and third thin metal plate layer, or a five or more layer structure containing a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, a fourth thin metal plate layer made of metal material with a different elasticity coefficient from that of the third thin metal plate layer, and a fifth thin metal plate layer made of metal material with a different elasticity coefficient from that of the fourth thin metal plate layer.

FIG. 9a schematically illustrates the whole structure of a load beam also serving as a base plate of the suspension in further embodiment according to the present invention, and FIG. 9b schematically illustrates a part of a top end section of the load beam shown in FIG. 9a.

In this embodiment, the load beam has no load generation region for producing a force to press the magnetic head slider toward the magnetic disk surface, and the whole section of the load beam has a high stiffness. The load force applied to the magnetic head slider will be produced by some kind of load generation means other than the load beam in this embodiment.

The load beam 92 in this embodiment is obtained by shaping a multilayered plate member. This multilayered plate member is, as clearly shown in FIGS. 9a and 9b, formed by laminating a first thin metal plate layer 92a such as a stainless steel plate with a thickness of about 51 µm for example, a resin layer 92b such as a polyimide resin plate with a thickness of about 75 µm for example, and a second thin metal plate layer 92c such as a stainless steel plate with a thickness of about 51 µm for example, in this order from the top.

Particularly, in this embodiment, both side edges of only the second thin metal plate layer 92c that is a surface layer (an upper or top surface layer or a lower or bottom surface layer in the laminating direction) of the load beam are bent toward a direction of the neighbor resin layer 92b to form bending sections or ribs 92d and 92e. The ribs 92d and 92e at the both side edges are formed along substantially the whole region except for a section used for attaching the load beam 92 to a drive arm.

The load beam with such structure is formed by bonding sheets 92a, 92b and 92c together, which have been preliminarily shaped such that both side edges of only the surface sheet that corresponds to the second thin metal plate layer 92c are outwardly extending in plane, and then by stamping the bonded sheets using for example a stamping die to bend the outwardly extending side edges of the sheet 92c. Alternately, the load beam may be formed by bonding together sheets 92a, 92b and 92c with the same shape, then by shaping or by etching for example the bonded sheet so that both side edges of only the surface sheet that corresponds to the second thin metal plate layer 92c outwardly extend in plane, and thereafter by stamping the sheets using for example a stamping die to bend the outwardly extending side edges of the sheet 92c.

Since both side edges of only the second thin metal plate layer 92c that is a surface layer (an upper or top surface layer or a lower or bottom surface layer in the laminating direction) are bent to form the ribs, not only the bending process can be performed very easy but also sufficient bending stiffness can be obtained even if the load beam is thin. Particularly, according to this embodiment, since it is not necessary to thicken each layer of the load beam, total weight of the suspension will not increase and the manufacturing cost can be kept low.

As shown in Table 2, the structure of this embodiment of FIGS. 9a and 9b has sufficient bending stiffness because its primary bending mode is near 2000 Hz. As will be noted from this Table 2, this structure has somewhat poor vibration characteristics in comparison with the structure of FIGS. 5a and 5b because spaces used for inserting a stamping die are remained at the inside of the ribs. However, since the space itself is small, in practice, there occurs no problem.

The multilayered plate member of the load beam in this embodiment is a three-layer structure consisting of the first thin metal plate layer, the resin layer and the second thin metal plate layer. In modification, however, the multilayered plate member may be a three-layer structure consisting of a first thin metal plate layer, a second thin metal plate layer made of metal material with a different elasticity coefficient from that of the first thin metal plate layer, and a third thin metal plate layer made of metal material with a different elasticity coefficient from that of the second thin metal plate layer. A thin metal plate made of metal material with a different elasticity coefficient from that of the stainless steel thin plate may be for example an aluminum thin plate or a titanium thin plate.

In further modification, the multilayered plate member may be a four-layer structure consisting of a first thin metal plate layer, a first resin layer, a second thin metal plate layer and a second resin layer, or a four-layer structure consisting of a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, and a fourth thin metal plate layer made of metal material with a different elasticity coefficient from that of the third thin metal plate layer.

In still further modification, the multilayered plate member may be a five or more layer structure containing a first thin metal plate layer, a first resin layer, a second thin metal plate layer, a second resin layer and third thin metal plate layer, or a five or more layer structure containing a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, a fourth thin metal plate layer made of metal material with a different elasticity coefficient from that of the third thin metal plate layer, and a fifth thin metal plate layer made of metal material with a different elasticity coefficient from that of the fourth thin metal plate layer.

FIG. 10a schematically illustrates the whole structure of a load beam also serving as a base plate of the suspension in still further embodiment according to the present invention, and FIG. 10b schematically illustrates a part of a top end section of the load beam shown in FIG. 10a.

In this embodiment, also, the load beam has no load generation region for producing a force to press the magnetic head slider toward the magnetic disk surface, and the whole section of the load beam has a high stiffness. The load force applied to the magnetic head slider will be produced by some kind of load generation means other than the load beam in this embodiment.

The load beam 102 in this embodiment is obtained by shaping a multilayered plate member. This multilayered plate member is, as clearly shown in FIGS. 10a and 10b, formed by laminating a first thin metal plate layer 102a such as a stainless steel plate with a thickness of about 51 µm for example, a resin layer 102b such as a polyimide resin plate with a thickness of about 75 µm for example, and a second thin metal plate layer 102c such as a stainless steel plate with a thickness of about 51 µm for example, in this order from the top.

Particularly, in this embodiment, both side edges of the first thin metal plate layer 102a that is a surface layer (an upper or top surface layer or a lower or bottom surface layer in the laminating direction) and both side edges of the resin layer 102b of the load beam are bent toward a direction moving away from the second thin metal plate layer 102c to form bending sections or ribs 102d and 102e. The ribs 102d and 102e at the both side edges are formed along substantially the whole region except for a section used for attaching the load beam 102 to a drive arm.

The load beam with such structure is formed by bonding sheets 102a, 102b and 102c together, which have been preliminarily shaped such that both side edges of the surface sheet that corresponds to the first thin metal plate layer 102a and both side edges of the sheet that corresponds to the resin layer 102b are outwardly extending in plane, and then by stamping the bonded sheets using for example a stamping die to bend the outwardly extending side edges of the sheets 102a and 102b. Alternately, the load beam may be formed by bonding together sheets 102a, 102b and 102c with the same shape, then by shaping or by etching for example the bonded sheet so that both side edges of the surface sheet that corresponds to the first thin metal plate layer 102a and both side edges of the sheet that corresponds to the resin layer 102b outwardly extend in plane, and thereafter by stamping the sheets using for example a stamping die to bend the outwardly extending side edges of the sheets 102a and 102b.

Since both side edges of only the first thin metal plate layer 102a that is a surface layer (an upper or top surface layer or a lower or bottom surface layer in the laminating direction) and the resin layer 102b are bent to form the ribs, not only the bending process can be performed very easy but also sufficient bending stiffness can be obtained even if the load beam is thin. Particularly, according to this embodiment, since it is not necessary to thicken each layer of the load beam, total weight of the suspension will not increase and the manufacturing cost can be kept low.

As shown in Table 2, the structure of this embodiment of FIGS. 10a and 10b has sufficient bending stiffness because its primary bending mode is near 2000 Hz.

The multilayered plate member of the load beam in this embodiment is a three-layer structure consisting of the first thin metal plate layer, the resin layer and the second thin metal plate layer. In modification, however, the multilayered plate member may be a three-layer structure consisting of a first thin metal plate layer, a second thin metal plate layer made of metal material with a different elasticity coefficient from that of the first thin metal plate layer, and a third thin metal plate layer made of metal material with a different elasticity coefficient from that of the second thin metal plate layer. A thin metal plate made of metal material with a different elasticity coefficient from that of the stainless steel thin plate may be for example an aluminum thin plate or a titanium thin plate.

In further modification, the multilayered plate member may be a four-layer structure consisting of a first thin metal plate layer, a first resin layer, a second thin metal plate layer and a second resin layer, or a four-layer structure consisting of a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, and a fourth thin metal plate layer made of metal material with a different elasticity coefficient from that of the third thin metal plate layer.

In still further modification, the multilayered plate member may be a five or more layer structure containing a first thin metal plate layer, a first resin layer, a second thin metal plate layer, a second resin layer and third thin metal plate layer, or a five or more layer structure containing a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, a fourth thin metal plate layer made of metal material with a different elasticity coefficient from that of the third thin metal plate layer, and a fifth thin metal plate layer made of metal material with a different elasticity coefficient from that of the fourth thin metal plate layer.

Figure 11A:
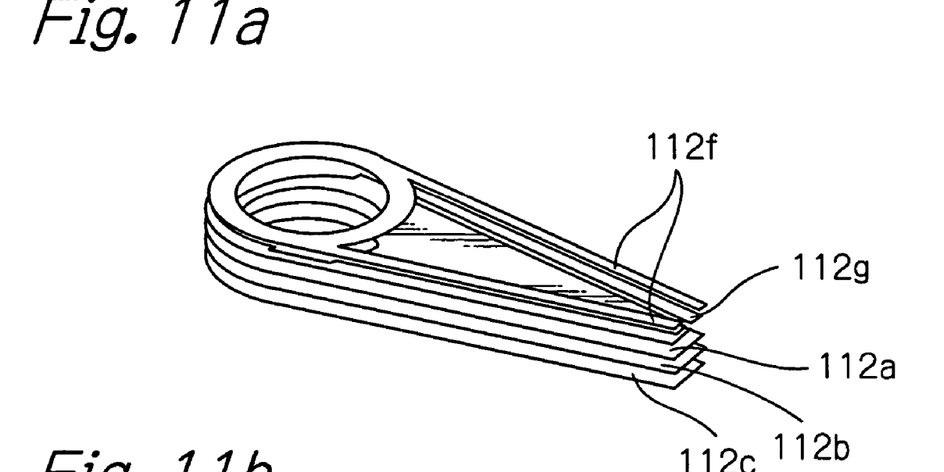
FIG. 11a is an exploded oblique view schematically illustrating the whole structure of a load beam also serving as a base plate of the suspension in further embodiment according to the present invention.
Figure 11B:
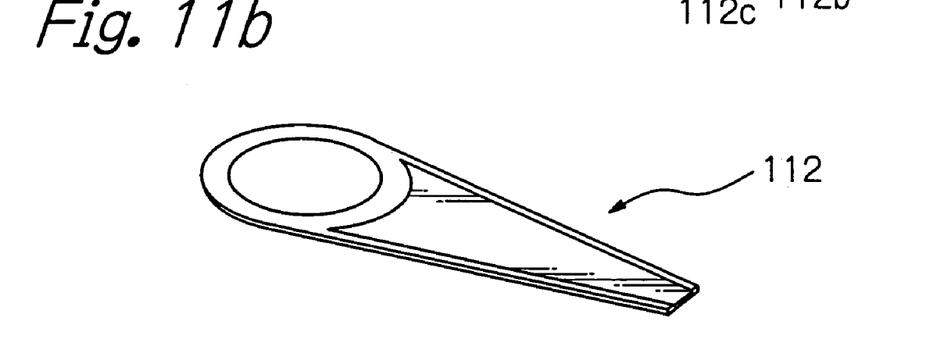
Figure 11C:
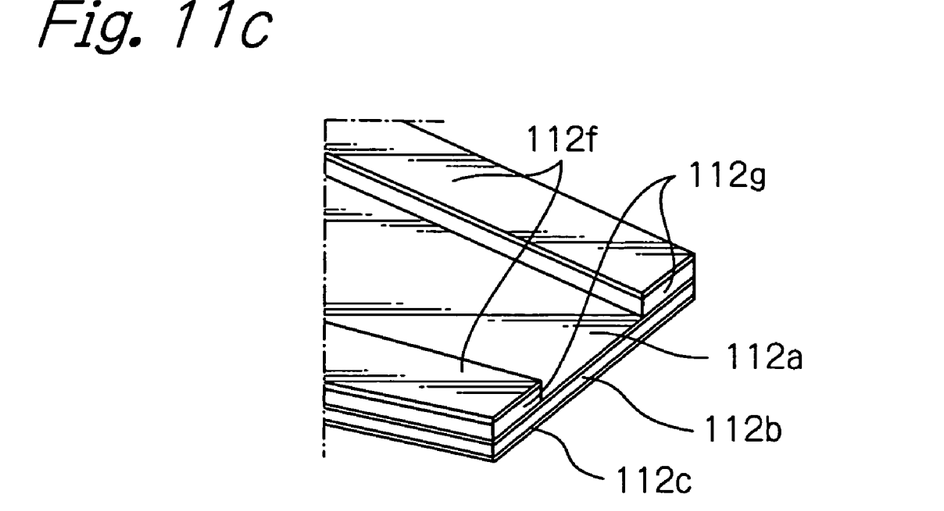

FIG. 11a schematically illustrates the whole structure of a load beam also serving as a base plate of the suspension in further embodiment according to the present invention, FIG. 11b schematically illustrates the whole structure of the load beam shown in FIG. 11a, and FIG. 11c schematically illustrates a part of a top end section of the load beam shown in FIG. 11a.

In this embodiment, also, the load beam has no load generation region for producing a force to press the magnetic head slider toward the magnetic disk surface, and the whole section of the load beam has a high stiffness. The load force applied to the magnetic head slider will be produced by some kind of load generation means other than the load beam in this embodiment.

The load beam 112 in this embodiment is obtained by shaping a multilayered plate member and by laminating a reinforce member on the multilayered plate member. The multilayered plate member is, as clearly shown in FIGS. 11a, 11b and 11c, formed by laminating a first thin metal plate layer 112a such as a stainless steel plate with a thickness of about 51 μm for example, a resin layer 112b such as a polyimide resin plate with a thickness of about 75 μm for example, and a second thin metal plate layer 112c such as a stainless steel plate with a thickness of about 51 μm for example, in this order from the top. The reinforce member has a base section and strip-shaped arm sections extending from the base section along respective side edges of the multilayered plate member. These arm sections are laminated on only both side edge sections of the first thin metal plate layer 112a that is a surface layer (an upper or top surface layer or a lower or bottom surface layer in the laminating direction). The reinforce member in this embodiment is multilayered plate member with a thin metal plate layer 112f such as a stainless steel plate with a thickness of about 51 μm for example and a resin layer 112g such as a polyimide resin plate with a thickness of about 75 μm for example, laminated in this order from the top.

The reinforce layers 112f and 112g at the both side edge sections are formed along substantially the whole region.

The load beam with such structure is formed by bonding sheets 112a, 112b, 112c, 112f and 112g together, which have been preliminarily shaped such that the sheets 112a, 112b and 112c have a required outer shape and that the arm sections of the reinforce sheets 112f and 112g extend along both side edges of the sheets 112a, 112b and 112c. Alternately, the load beam may be formed by bonding together sheets 112a, 112b, 112c, 112f and 112g with the same shape, then by shaping or by etching for example the bonded sheet so that the sheets 112a, 112b and 112c have a required outer shape and that the arm sections of the reinforce sheets 112f and 112g extend along both side edges of the sheets 112a, 112b and 112c.

Since the reinforce member 112f and 112g are laminated on both side edge sections, not only the bending process can be omitted but also sufficient bending stiffness can be obtained even if the load beam is thin. Particularly, according to this embodiment, since it is not necessary to thicken each layer of the load beam, total weight of the suspension will not increase and the manufacturing cost can be kept low.

Bending stiffness of the structure of this embodiment shown in FIGS. 11a, 11b and 11c was analyzed by simulation. Table 3 shows the results of this simulation.

TABLE 3

|  | Primary Bending Mode | Primary Torsion Mode | Secondary Bending Mode |
|---|---|---|---|
| Structure of FIGS. 11a, 11b and 11c | 1933.8 Hz | 9182.2 Hz | 9704.3 Hz |

As shown in Table 3, the structure of this embodiment of FIGS. 11a, 11b and 11c with the reinforce member 112f and 112g laminated on both side edge sections of the load beam has sufficient bending stiffness because its primary bending mode is near 2000 Hz.

The multilayered plate member of the load beam in this embodiment is a three-layer structure consisting of the first thin metal plate layer, the resin layer and the second thin metal plate layer. In modification, however, the multilayered plate member may be a three-layer structure consisting of a first thin metal plate layer, a second thin metal plate layer made of metal material with a different elasticity coefficient from that of the first thin metal plate layer, and a third thin metal plate layer made of metal material with a different elasticity coefficient from that of the second thin metal plate layer. A thin metal plate made of metal material with a different elasticity coefficient from that of the stainless steel thin plate may be for example an aluminum thin plate or a titanium thin plate.

In further modification, the multilayered plate member may be a four-layer structure consisting of a first thin metal plate layer, a first resin layer, a second thin metal plate layer and a second resin layer, or a four-layer structure consisting of a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, and a fourth thin metal plate layer made of metal material with a different elasticity coefficient from that of the third thin metal plate layer.

In still further modification, the multilayered plate member may be a five or more layer structure containing a first thin metal plate layer, a first resin layer, a second thin metal plate layer, a second resin layer and third thin metal plate layer, or a five or more layer structure containing a first thin metal plate layer, a second thin metal plate layer made of metal material with a different elasticity coefficient from that of the first thin metal plate layer, a third thin metal plate layer made of metal material with a different elasticity coefficient from that of the second thin metal plate layer, a fourth thin metal plate layer made of metal material with a different elasticity coefficient from that of the third thin metal plate layer, and a fifth thin metal plate layer made of metal material with a different elasticity coefficient from that of the fourth thin metal plate layer.

The reinforce member in this embodiment is a two-layer structure consisting of the thin metal plate layer and the resin layer. In modification, however, the reinforce member may be a two-layer structure consisting of a first thin metal plate layer and a second thin metal plate layer made of metal material with a different elasticity coefficient from that of the first thin metal plate layer. A thin metal plate made of metal material with a different elasticity coefficient from that of the stainless steel thin plate may be for example an aluminum thin plate or a titanium thin plate. In further modification, the reinforce member may be a three or more layer structure. Also, it is possible to form the reinforce member by a single layer structure of a thin metal plate layer or a resin layer.

Structure and shape of the suspension of the HGA according to the present invention are not limited to the aforementioned structures and shape but various variations can be adopted.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A suspension comprising a multilayered plate member comprising at least three continuous layers laminated together and overlapping one another over an entire length portion of said multilayered plate member, a modulus of elasticity of neighbor layers of said at least three continuous layers being different from each other, both side edges of only a part of the layers of said multilayered plate member within a stiffness required region bent to form ribs, said multilayered plate member being pivotally securable to an assembly carriage.

2. The suspension as claimed in claim 1, wherein both side edges of only a surface layer of said multilayered plate member within a stiffness required region are bent to form ribs.

3. The suspension as claimed in claim 1, wherein both side edges of only a surface layer and its neighbor layer of said multilayered plate member within a stiffness required region are bent to form ribs.

4. The suspension as claimed in claim 1, wherein at least one layer of said multilayered plate member has a plane shape different from that of the other layer of said multilayered plate member.

5. The suspension as claimed in claim 1, wherein said multilayered plate member comprises a first thin metal plate layer, a resin layer laminated on said first thin metal plate layer, and a second thin metal plate layer laminated on said resin layer.

6. The suspension as claimed in claim 1, wherein said multilayered plate member comprises a first thin metal plate layer, a second thin metal plate layer laminated on said first thin metal plate layer and provided with an elasticity coefficient different from that of said first thin metal plate layer, and a third thin metal plate layer laminated on said second thin metal plate layer and provided with an elasticity coefficient different from that of said second thin metal plate layer.

7. The suspension as claimed in claim 1, wherein said multilayered plate member comprises a first thin metal plate layer, a first resin layer laminated on said first thin metal plate layer, a second thin metal plate layer laminated on said first resin layer, a second resin layer laminated on said second thin metal plate layer, and a third thin metal plate layer laminated on said second resin layer.

8. The suspension as claimed in claim 1, wherein said multilayered plate member comprises a first thin metal plate layer, a second thin metal plate layer laminated on said first thin metal plate layer and provided with an elasticity coefficient different from that of said first thin metal plate layer, a third thin metal plate layer laminated on said second thin metal plate layer and provided with an elasticity coefficient different from that of said second thin metal plate layer, a fourth thin metal plate layer laminated on said third thin metal plate layer and provided with an elasticity coefficient different from that of said third thin metal plate layer, and a fifth thin metal plate layer laminated on said fourth thin metal plate layer and provided with an elasticity coefficient different from that of said fourth thin metal plate layer.

9. A head gimbal assembly comprising:
a suspension including a multilayered plate member comprising at least three continuous layers laminated together and overlapping one another over an entire length portion of said multilayered plate member, a modulus of elasticity of neighbor layers of said at least three continuous layers being different from each other, both side edges of only a part of the layers of said multilayered plate member within a stiffness required region bent to form ribs, said multilayered plate member being pivotally securable to an assembly carriage; and
a head slider with at least one head element, said head slider being mounted on said suspension.

10. The head gimbal assembly as claimed in claim 9, wherein both side edges of only a surface layer of said multilayered plate member within stiffness required region are bent to form ribs.

11. The head gimbal assembly as claimed in claim 9, wherein both side edges of only a surface layer and its neighbor layer of said multilayered plate member within stiffness required region are bent to form ribs.

12. The head gimbal assembly as claimed in claim 9, wherein said multilayered plate member comprises a first thin metal plate layer, a resin layer laminated on said first thin metal plate layer, and a second thin metal plate layer laminated on said resin layer.

13. A disk drive apparatus with at least one head gimbal assembly comprising:
a suspension including a multilayered plate member comprising at least three continuous layers laminated together and overlapping one another over an entire length portion of said multilayered plate member, a modulus of elasticity of neighbor layers of said at least three continuous layers being different from each other, both side edges of only a part of the layers of said multilayered plate member within a stiffness required region bent to form ribs, said multilayered plate member being pivotally securable to an assembly carriage; and
a head slider with at least one head element, said head slider being mounted on said suspension.

14. The disk drive apparatus as claimed in claim 13, wherein both side edges of only a surface layer of said multilayered plate member within a stiffness required region are bent to form ribs.

15. The disk drive apparatus as claimed in claim 13, wherein both side edges of only a surface layer and its neighbor layer of said multilayered plate member within a stiffness required region are bent to form ribs.

16. The disk drive apparatus as claimed in claim 13, wherein said multilayered plate member comprises a first thin metal plate layer, a resin layer laminated on said first thin metal plate layer, and a second thin metal plate layer laminated on said resin layer.

* * * * *